United States Patent
Lee et al.

(10) Patent No.: US 12,115,972 B2
(45) Date of Patent: *Oct. 15, 2024

(54) APPARATUS FOR CONTROLLING HYBRID VEHICLE AND METHOD USING THE SAME

(71) Applicants: Hyundai Motor Company, Seoul (KR); Kia Motors Corporation, Seoul (KR)

(72) Inventors: Jonghyeok Lee, Gyeonggi-do (KR); Dong Hee Han, Gyeonggi-do (KR); Hyunjin Kang, Gyeonggi-do (KR); Kwanhee Lee, Gyeonggi-do (KR); Yeongseop Park, Seoul (KR); Seungwoo Hong, Seoul (KR); Yong Kak Choi, Seoul (KR); Heechang Oh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 996 days.

This patent is subject to a terminal disclaimer.

(21) Appl. No.: 17/103,214

(22) Filed: Nov. 24, 2020

(65) Prior Publication Data
US 2022/0080950 A1     Mar. 17, 2022

(30) Foreign Application Priority Data
Sep. 15, 2020    (KR) .......................... 10-2020-0118425

(51) Int. Cl.
*B60W 10/00*     (2006.01)
*B60W 20/12*     (2016.01)
(Continued)

(52) U.S. Cl.
CPC ............ *B60W 20/40* (2013.01); *B60W 20/12* (2016.01); *B60W 20/15* (2016.01); *B60W 20/20* (2013.01); *B60W 2510/244* (2013.01)

(58) Field of Classification Search
CPC ...... B60W 20/40; B60W 20/12; B60W 20/15; B60W 20/20; B60W 2510/244;
(Continued)

(56) References Cited

U.S. PATENT DOCUMENTS 5,884,477 A * 3/1999 Andou ................ F02D 41/0235
                                                           60/285
9,987,946 B2 * 6/2018 Park ....................... B60W 20/20
(Continued)

*Primary Examiner* — Masud Ahmed
(74) *Attorney, Agent, or Firm* — Fox Rothschild LLP

(57) ABSTRACT

An apparatus for controlling a hybrid vehicle includes an engine; a drive motor; a battery; an electric supercharger configured to be installed in an intake line in which an intake air supplied to a combustion chamber of the engine flows; a navigation device configure to calculate a driving path from a starting point to a destination point and driving information; a controller configure to calculate a driving load from the driving path and the driving information calculated by the navigation device, determine an optimal SOC (state of charge) for each section from the starting point to destination point based on the driving load, determine a driving mode of the vehicle based on a required torque of driver and a driving mode of the battery to follow the optimal SOC for each section, and adjust an operating point of the engine.

20 Claims, 13 Drawing Sheets

(51) Int. Cl.
*B60W 20/15* (2016.01)
*B60W 20/20* (2016.01)
*B60W 20/40* (2016.01)

(58) Field of Classification Search
CPC ....... B60W 2556/50; B60W 2710/244; B60W 10/08; B60W 10/30; B60W 20/11; B60W 20/13; B60W 10/06; B60W 2540/00; B60W 10/26; B60W 30/182; B60W 50/082; B60W 50/10; F02B 39/10; Y02T 10/62; Y04S 10/126; F02D 41/0007; G01C 21/3453
See application file for complete search history.

(56) References Cited

U.S. PATENT DOCUMENTS

| | | | |
|---|---|---|---|
| 10,449,947 B2* | 10/2019 | Huh | B60K 6/442 |
| 11,040,723 B2* | 6/2021 | Kim | B60W 50/082 |
| 11,485,351 B2* | 11/2022 | Park | B60W 20/15 |
| 2009/0118078 A1* | 5/2009 | Wilmanowicz | B60W 20/15 |
| | | | 477/3 |
| 2012/0029742 A1* | 2/2012 | Worthing | F02D 11/105 |
| | | | 180/65.21 |
| 2012/0072063 A1* | 3/2012 | Kato | B60W 10/26 |
| | | | 180/65.265 |
| 2016/0009271 A1* | 1/2016 | Choi | B60W 30/182 |
| | | | 180/65.265 |
| 2017/0057485 A1* | 3/2017 | Choi | B60W 30/1882 |
| 2019/0170052 A1* | 6/2019 | Dudar | F02D 41/0087 |
| 2021/0078563 A1* | 3/2021 | Tabata | B60K 6/445 |
| 2021/0146912 A1* | 5/2021 | Choi | F01N 3/10 |
| 2021/0155225 A1* | 5/2021 | Choi | F02D 41/0055 |
| 2021/0179067 A1* | 6/2021 | Choi | B60W 10/08 |
| 2022/0080950 A1* | 3/2022 | Lee | B60W 10/08 |

\* cited by examiner

APPARATUS FOR CONTROLLING HYBRID VEHICLE AND METHOD USING THE SAME

CROSS-REFERENCE TO RELATED APPLICATION

This application claims under 35 U.S.C. § 119 the benefit of Korean Patent Application No. 10-2020-0118425 filed in the Korean Intellectual Property Office on Sep. 15, 2020, the entire contents of which are incorporated herein by reference.

BACKGROUND

(a) Technical Field

The present disclosure relates to an apparatus for controlling a hybrid vehicle and a method using the same, more particularly, to the apparatus for controlling the hybrid vehicle and the method that can stably manage a state of charge (SOC) of a battery by predicting driving information of the hybrid vehicle.

(b) Description of the Related Art

A hybrid vehicle is a vehicle that uses two or more power sources, and generally refers to a hybrid electric vehicle driven using an engine and a motor. The hybrid electric vehicle may have various structures using two or more power sources including the engine and the motor.

In general, a hybrid electric vehicle uses a power train in a manner of a transmission mounted electronic device (TMED) in which a drive motor, a transmission, and drive shaft are connected in series to each other.

In addition, a clutch is disposed between an engine and a motor, and the hybrid electric vehicle is driven in an electric vehicle (EV) mode, in a hybrid electric vehicle (HEV) mode, or in an engine single mode depending on whether the clutch is engaged. The EV mode is a mode in which a vehicle is driven by only driving torque of a drive motor, the HEV mode is a mode in which the vehicle is driven by driving torque of the drive motor and the engine, and the engine mode is a mode in which the vehicle is driven by only driving torque of the engine.

An operating point of the hybrid vehicle is determined according to a torque requirement of a driver, but it is important to constantly maintain a State Of Charge (SOC), i.e., a charging state of a battery according to a travelling situation of the vehicle.

In general, the hybrid vehicle is driven in an optimal operating point of the engine, a difference between the required torque and the engine torque in the optimal operating point is assisted by a drive motor when a required torque of a drive is greater than the optimal operating point of the engine, and a difference between the required torque and the engine torque in the optimal operating point is charged in the battery through a regenerative braking of the drive motor when the required torque of the driver is less than the engine torque in the optimal operating point of the engine.

However, when the engine cannot be operated in the optimal operating point to charge the battery due to lack of SOC, the vehicle's fuel efficiency deteriorates. On the other hand, when the engine is continuously operated in the optimal operating point, charging and discharging loss of the battery occurs.

The above information disclosed in this Background section is only for enhancement of understanding of the background of the disclosure, and therefore it may contain information that does not form the prior art that is already known in this country to a person of ordinary skill in the art.

SUMMARY

An exemplary embodiment of the present disclosure provides an apparatus for controlling a hybrid vehicle and a method using the same, in which charging and discharging loss of a battery are minimized.

An apparatus for controlling a vehicle (e.g., a hybrid vehicle) according to an exemplary embodiment of the present disclosure, may include an engine configured to combust fuel to generate power; a drive motor configured to assist the power of the engine and to selectively operate as a generator to generate electrical energy; a battery configured to supply electrical energy to the drive motor or to be charged by the electrical energy generated by the drive motor; an electric supercharger configured to be installed in an intake line in which an intake air supplied to a combustion chamber of the engine flows; a navigation device configure to calculate a driving path from a starting point to a destination point and driving information; a controller configure to calculate a driving load from the driving path and the driving information calculated by the navigation device, determine an optimal SOC (state of charge) for each section from the starting point to the destination point based on the driving load, determine a driving mode of the vehicle based on a required torque of a driver (i.e., a person depressing an accelerator pedal and driving a vehicle, or in the case of an autonomous vehicle, a controller that controls operation of the accelerator pedal or the like) and a driving mode of the battery to follow the optimal SOC for each section, and adjust an operating point of the engine.

The driving mode of the vehicle may include an EV (electric vehicle) mode in which the vehicle travels only with driving power of the drive motor, an engine single mode in which the vehicle travels with driving power of the engine without supplying supercharged air of the electric supercharger; an supercharged engine mode in which the vehicle travels with driving power of the engine by receiving the supercharged air from the electric supercharger; a normal hybrid electric vehicle (HEV) mode in which the vehicle travels with driving power of the drive motor and driving power of the engine without supplement of the supercharged air by the electric supercharger, and a supercharged HEV mode in which the vehicle travels with driving power of the drive motor and driving power of the engine with supplement of the supercharged air by the electric supercharger.

When the required torque of the driver is less than a predetermined value which is less than an engine torque in an optimal operating line and the driving mode of the battery is a discharging mode, the controller may determine the driving mode of the vehicle as the EV mode.

When the required torque of the driver is less than a predetermined value which is less than an engine torque in an optimal operating line and the driving mode of the battery is a charging mode, the controller may determine the driving mode of the vehicle as the engine single mode.

When the required torque of the driver is less than a reference torque in an optimal operating line and the driving mode of the battery is a discharging mode, the controller may determine the driving mode of the vehicle as the normal HEV mode.

When the required torque of the driver is less than a reference torque in an optimal operating line and the driving mode of the battery is a charging mode, the controller may determine the driving mode of the vehicle as the normal HEV mode.

When the required torque of the driver is greater than a reference torque in an optimal operating line and the driving mode of the battery is a discharging mode, the controller may determine the driving mode of the vehicle as the normal HEV mode.

When the required torque of the driver is greater than a reference torque in an optimal operating line and the driving mode of the battery is a charging mode, the controller may determine the driving mode of the vehicle as the supercharged engine mode.

When required torque of the driver exceeds an optimal operating line and the driving mode of the battery is a discharging mode, the controller may determine the driving mode of the vehicle as the supercharged HEV mode.

When required torque of the driver exceeds an optimal operating line and the driving mode of the battery is a charging mode, the controller may determine the driving mode of the vehicle as the supercharged engine mode.

A method of controlling a hybrid vehicle provided with an electric supercharger according to another exemplary embodiment of the present disclosure, the method may include calculating, by a navigation device, a driving path from a starting point to a destination point and driving information; calculating, by a controller, a driving load based on the driving path and the driving information; calculating, by the controller, an optimal SOC (state of charge) of a battery for each section based on the driving load; determining, by the controller, a driving mode of the vehicle based on a required torque of a driver and a driving mode of the battery to follow the optimal SOC for each section; and adjusting, by the controller, an operating point of an engine.

The driving mode of the vehicle may include an EV (electric vehicle) mode in which the vehicle travels only with driving power of a drive motor, an engine single mode in which the vehicle travels with driving power of the engine without supplying supercharged air of the electric supercharger; an supercharged engine mode in which the vehicle travels with driving power of the engine by receiving the supercharged air from the electric supercharger; a normal hybrid electric vehicle (HEV) mode in which the vehicle travels with driving power of the drive motor and driving power of the engine without supplement of the supercharged air by the electric supercharger, and a supercharged HEV mode in which the vehicle travels with driving power of the drive motor and driving power of the engine with supplement of the supercharged air by the electric supercharger.

When the required torque of the driver is less than a predetermined value which is less than an engine torque in an optimal operating line and the driving mode of the battery is a discharging mode, the driving mode of the vehicle may be determined as the EV mode.

When the required torque of the driver is less than a predetermined value which is less than an engine torque in an optimal operating line and the driving mode of the battery is a charging mode, the driving mode of the vehicle may be determined as the engine single mode.

When the required torque of the driver is less than a reference torque in an optimal operating line and the driving mode of the battery is a discharging mode, the driving mode of the vehicle may be determined as the normal HEV mode.

When the required torque of the driver is less than a reference torque in an optimal operating line and the driving mode of the battery is a charging mode, the driving mode of the vehicle may be determined as the normal HEV mode.

When the required torque of the driver is greater than a reference torque in an optimal operating line and the driving mode of the battery is a discharging mode, the driving mode of the vehicle may be determined as the normal HEV mode.

When the required torque of the driver is greater than a reference torque in an optimal operating line and the driving mode of the battery is a charging mode, the driving mode of the vehicle may be determined as the supercharged engine mode.

When required torque of the driver exceeds an optimal operating line and the driving mode of the battery is a discharging mode, the driving mode of the vehicle may be determined as the supercharged HEV mode.

When required torque of the driver exceeds an optimal operating line and the driving mode of the battery is a charging mode, the driving mode of the vehicle may be determined as the supercharged engine mode.

According to the apparatus and the method of controlling the hybrid vehicle according to the exemplary embodiment of the present disclosure, it is possible to minimize charging loss and discharging loss of the battery by following the optimal SOC level for each section based on the driving load.

BRIEF DESCRIPTION OF THE DRAWINGS

Since the drawings are for reference to describe the exemplary embodiment of the present disclosure, the technical spirit of the present disclosure should not be interpreted as being limited to the accompanying drawings.

DETAILED DESCRIPTION OF THE EMBODIMENTS

Figure 1:
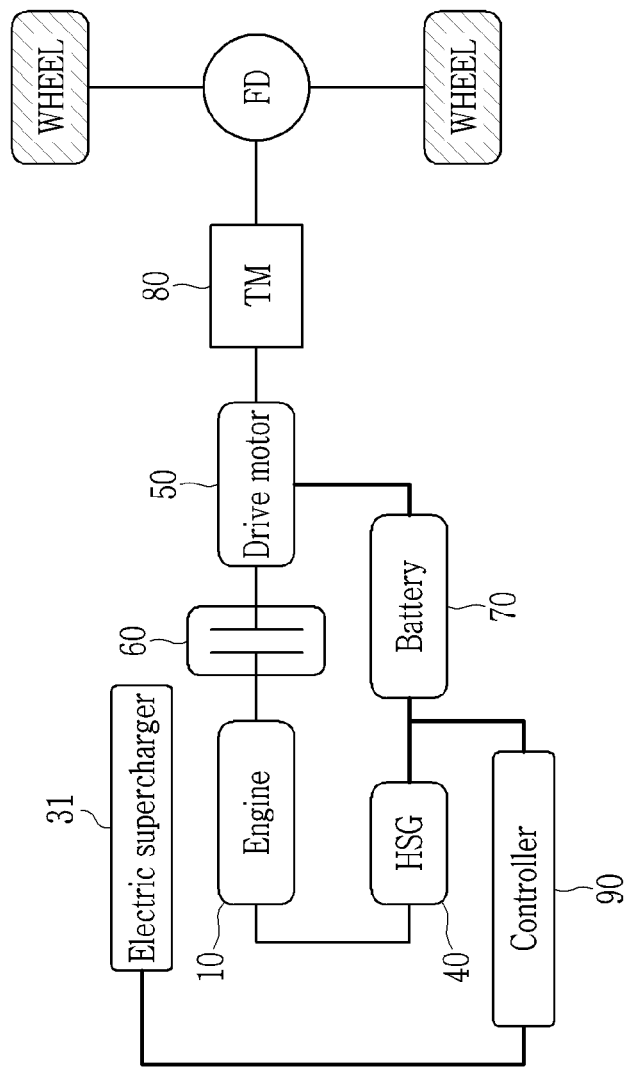
FIG. 1 is a conceptual diagram illustrating a configuration of an apparatus for controlling a hybrid vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

The drawings and description are to be regarded as illustrative in nature and not restrictive, and like reference numerals designate like elements throughout the specification.

In addition, the size and thickness of each configuration shown in the drawings are arbitrarily shown for understanding and ease of description, but the present disclosure is not limited thereto, and for clearly illustrate several portions and regions, thicknesses thereof are increased.

Hereinafter, an apparatus for controlling a vehicle (e.g., a hybrid vehicle) according to an exemplary embodiment of the present disclosure will be described in detail with reference to the accompanying drawings.

Figure 2:
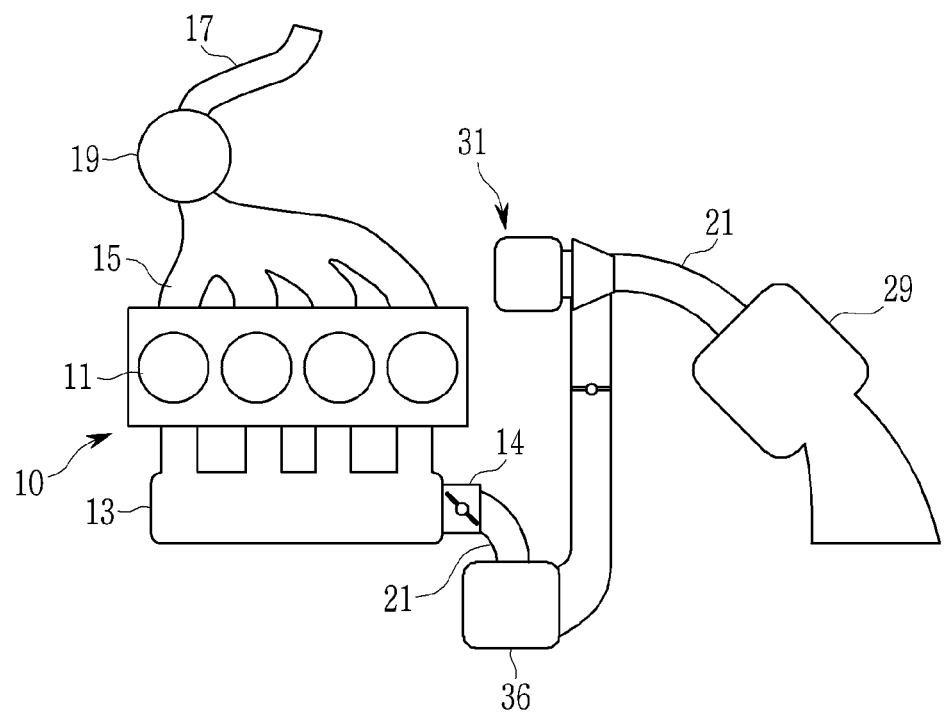
FIG. 2 is a conceptual diagram illustrating a relationship between an engine and an electric supercharger of the hybrid vehicle according to the exemplary embodiment of the present disclosure.
Figure 3:
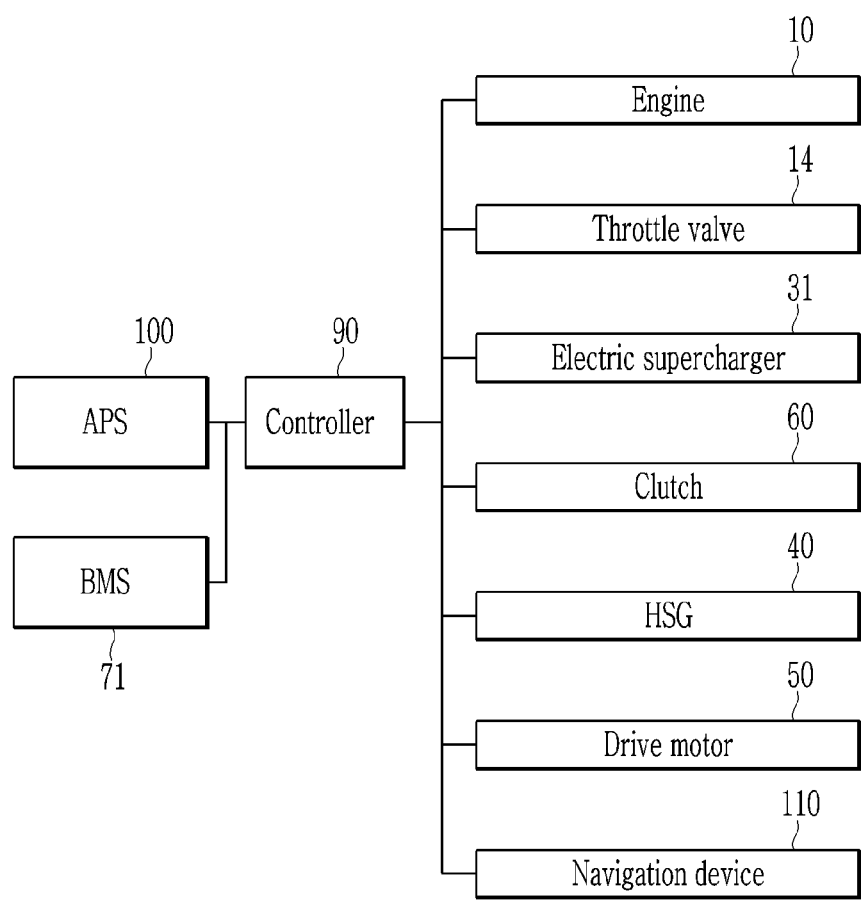
FIG. 3 is a block diagram illustrating the configuration of the apparatus for controlling the hybrid vehicle according to the exemplary embodiment of the present disclosure.

FIG. 1 is a conceptual diagram illustrating a configuration of an apparatus for controlling a hybrid vehicle according to an exemplary embodiment of the present disclosure. FIG. 2 is a conceptual diagram illustrating a relationship between an engine and an electric supercharger of the hybrid vehicle according to the exemplary embodiment of the present disclosure. FIG. 3 is a block diagram illustrating the configuration of the apparatus for controlling the hybrid vehicle according to the exemplary embodiment of the present disclosure.

The hybrid vehicle according to the exemplary embodiment of the present disclosure described below will be described based on a structure of a Transmission Mounted Electric Device (TMED) scheme as an example. However, the scope of the present disclosure is not limited thereto, and the present disclosure may be applied to hybrid electric vehicles in other schemes as a matter of course.

As shown in FIG. 1 to FIG. 3, a hybrid vehicle to which the apparatus for controlling the hybrid vehicle according to the exemplary embodiment of the present disclosure is applied may include an engine 10, a hybrid starter generator (HSG) 40, a drive motor 50, a clutch 60, a battery 70, an accelerator pedal sensor 100, a navigation device, and a controller 90.

The engine may generate a power required for driving the vehicle by burning fuel.

Referring to FIG. 2, intake air supplied to a combustion chamber 11 of the engine 10 is supplied through an intake line 21, and exhaust gas discharged from the combustion chamber 11 of the engine 10 is discharged to the outside through an exhaust manifold 15 and an exhaust line 17. In this case, a catalyst converter 19 including a catalyst which purifies the exhaust gas is installed in the exhaust line 17.

An electric supercharger 31 installed in the intake line 20 is for the purpose of supplying supercharged air to the combustion chamber 11, and includes a motor and an electric compressor. The electric compressor is operated by the motor and compresses outside air according to an operation condition and supplies the compressed outside air to the combustion chamber 11.

An intercooler 36 may be installed in the intake line 21. The supercharged air compressed by the electric supercharger 31 is cooled by the intercooler 36.

An air cleaner 29 for filtering outside air introduced from the outside is mounted in an entrance of the intake line 20.

Intake air introduced through the intake line 20 is supplied to the combustion chamber 11 through the intake manifold 13. A throttle valve 14 is mounted to the intake manifold 13, so that the amount of air supplied to the combustion chamber 11 is adjusted.

Referring back to FIG. 1, the HSG 40 starts the engine 10 and selectively operates as a power generator in a state where the engine 10 starts to generate electric energy.

The drive motor 50 assists power of the engine 10 and selectively operates as a power generator to generate electric energy.

The drive motor 50 is operated by using electric energy charged in the battery 70, and the electric energy generated in the drive motor 50 and the HSG 40 is charged in the battery 70.

The battery management system (BMS) 71 manages the overall operation and state of the battery 70, and transmits the state (e.g., SOC) of the battery 70 to the controller 90.

The accelerator pedal sensor (APS) 100 detects an operation of an acceleration pedal by a driver. The accelerator pedal position detected by the accelerator pedal sensor 100 is transmitted to the controller 90. The controller 90 may determine a torque requirement according to an acceleration intention of the driver from the accelerator pedal position detected by the accelerator pedal sensor, and selectively switch the travelling mode of the vehicle to the EV mode, the HEV mode, and the engine single mode.

The navigation device receives a starting point and a destination from the driver, calculates a driving path of the vehicle, and transmits driving information including congestion and slope of the driving path to the controller 90.

The controller 90 controls the constituent elements of the vehicle including the engine 10, the HSG 40, the drive motor 50, the electric supercharger 31, the battery 70, and the clutch 60.

To this end, the controller 90 may be provided as one or more processors operated by a set program, and the set program may perform each operation of a method of controlling a hybrid vehicle according to an exemplary embodiment of the present disclosure.

The clutch 60 is provided between the engine 10 and the drive motor 50, and the hybrid vehicle is operated in the engine 10 mode, the EV mode, or the Hybrid Electric Vehicle (HEV) mode according to the coupling of the clutch 60. The EV mode is the mode in which the vehicle travels only with driving power of the motor, the HEV mode is the mode in which the vehicle travels with driving power of the motor and the engine 10, and the engine single mode is the mode in which the vehicle travels only with driving power of the engine 10.

The driving mode of the apparatus for controlling the hybrid vehicle according to an exemplary embodiment of the present disclosure may include the EV mode, the engine single mode, a supercharged engine mode, a normal HEV mode, and a supercharged HEV mode.

The EV mode is the mode in which the vehicle travels only with driving power of the drive motor 50 as described above.

The engine single mode is the mode in which the vehicle travels only with driving power of the engine 10 without assisting of the drive motor 50, and may be a kind of NA (natural aspiration) engine mode.

The supercharged engine mode is the mode in which the vehicle travels with driving power of the engine 10 by receiving the supercharged air from the electric supercharger 31.

The normal HEV mode is the mode in which the vehicle travels with driving power of the drive motor 50 and the engine 10, as described above. In the normal HEV mode, the supercharged air by the electric supercharger 31 is not supplied to the engine 10.

The supercharged HEV mode is the mode in which the vehicle travels with driving power of the drive motor 50 and the engine 10. In the supercharged HEV mode, the supercharged air by the electric supercharger 31 is supplied to the engine 10.

The driving power output from the engine 10 and the drive motor 50 is transferred to the driving wheels provided in the vehicle. In this case, a transmission 80 is provided between the clutch 60 and the driving wheels. A shifting gear is installed inside the transmission 80, so that torque output from the engine 10 and the drive motor 50 is changed according to a shifting gear stage.

Hereinafter, a method of controlling a hybrid vehicle according to an exemplary embodiment of the present disclosure will be described in detail with reference to the accompanying drawings.

Figure 4:
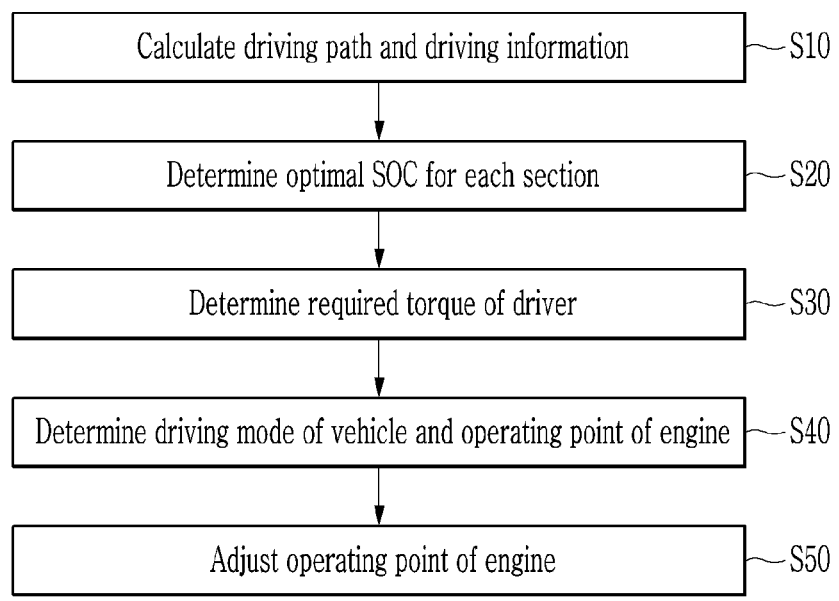
FIG. 4 is a flowchart illustrating a method of controlling a hybrid vehicle according to an exemplary embodiment of the present disclosure.

FIG. 4 is a flowchart illustrating a method of controlling a hybrid vehicle according to an exemplary embodiment of the present disclosure.

As shown in FIG. 4, when the driver inputs the starting point and destination into the navigation device 110, the navigation device 110 calculates or predicts the driving path to the destination, calculates driving information including a congestion of the driving path, a slope of the driving path, a travel distance and an estimated time to the destination, and transmits the driving information to the controller 90 at step S10.

The controller 90 determines an optimal SOC (state of charge) for each section of the battery 70 based on the driving information at step S20. At this time, the controller 90 may calculate a driving load for each section based on the vehicle speed for each section calculated from the congestion of the driving path, the inclination of the driving path, the travel distance and the estimated time to the destination. And the controller 90 calculates an optimal SOC of the battery 70 from the driving load for each section.

Figure 5:
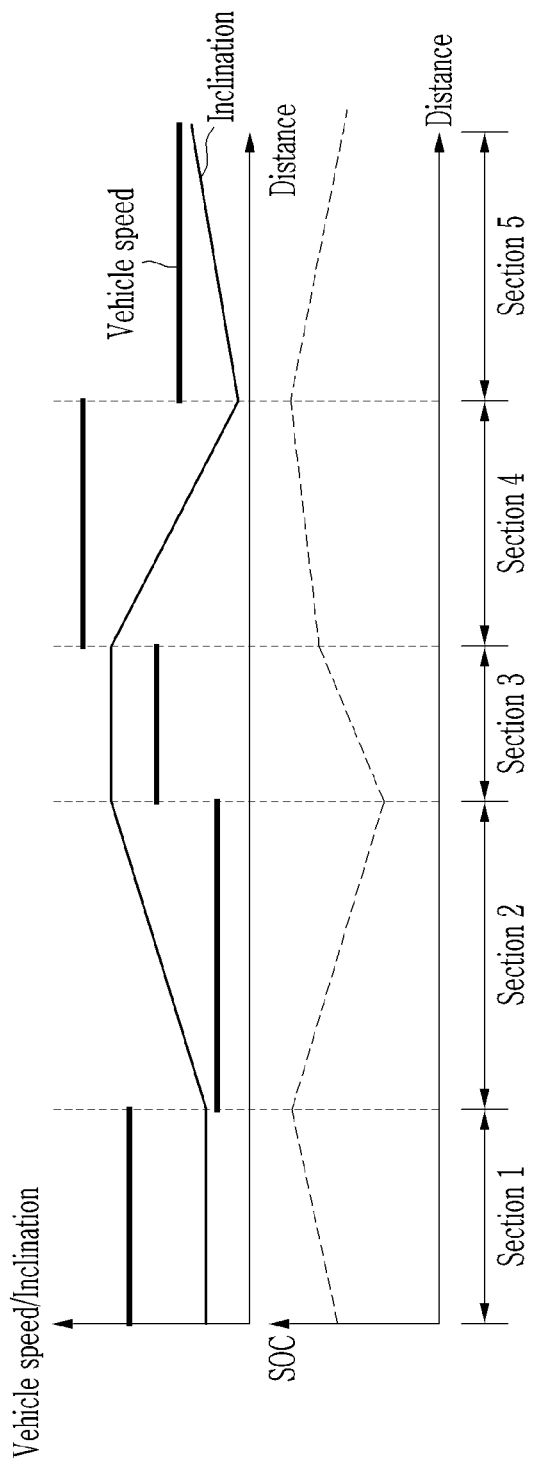
FIG. 5 is a graph illustrating optimal SOC for each section according to an exemplary embodiment of the present disclosure.

As shown in FIG. 5, since the congestion of the driving path is low and the vehicle speed is fast in the flat section, the optimal SOC may be increased gradually (refer to section 1 of FIG. 5). Since the congestion is moderate and the vehicle speed is slow in the uphill section, the optimal SOC may decrease rapidly (refer to section 2 of FIG. 5). In the flat section in which the congestion is high and the vehicle speed is slow, the optimal SOC may increase rapidly (refer to section 3 of FIG. 5). In the downhill section in which the congestion is low and the vehicle speed is fast, the optimal SOC may increase gradually (refer to section 4 of FIG. 5). In addition, in the uphill section of the section 5 in which the congestion is low and the vehicle speed is relatively faster than in the section 2, the optimal SOC may be decreased gradually (refer to section 5 of FIG. 5). The optimal SOC may be determined by repeated experiments.

When the vehicle starts driving, the controller 90 determines the required torque of the driver from the position of the accelerator pedal sensor 100 at step S30.

The controller 90 determines the driving mode of the vehicle and the operating point of the engine 10 based on a charging mode and a discharging mode which is a driving mode of the battery to follow the required torque of the driver and the optimal SOC at step S40.

The driving mode of the vehicle, as described above, may include the EV mode, the engine single mode, the supercharged engine mode, the normal HEV mode, and the supercharged HEV mode.

The controller 90 calculates an average charging amount and/or average discharging amount to follow the optimal SOC for each section. At this time, the average charging and discharging amount may be calculated from a variation of SOC per unit distance. In general, SOC is expressed as a percentage, but since it is converted through an output voltage of the battery, the unit of SOC may be expressed as a voltage.

Figure 6:
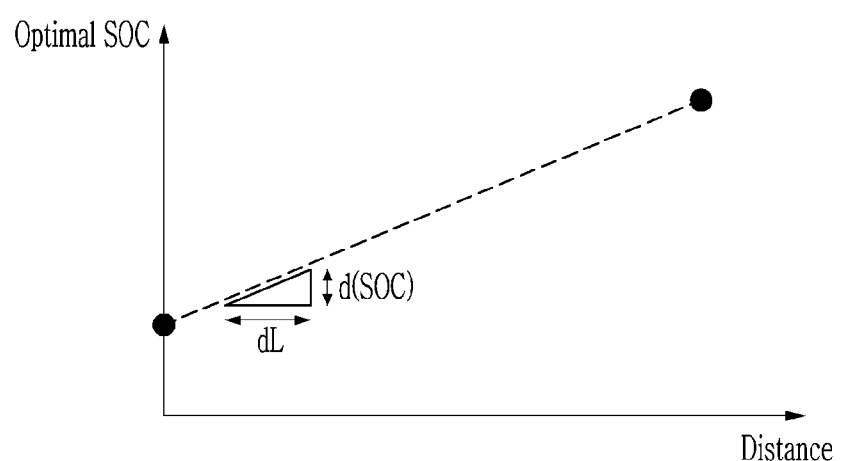
FIG. 6 is a drawing for explaining a method of calculating average charging and discharging amounts according to an exemplary embodiment of the present disclosure.

Referring to FIG. 6, the average charging and discharging amount for following the optimal SOC may be determined from the below Equation 1.

$$W_{ref}[kw] = \frac{d(SOC)}{dL} \times dL \times I(SOC) \quad \text{[Equation 1]}$$

In Equation 1, Wref denotes the SOC charging/discharging amount (kW), d(SOC)/dL denotes the variation of SOC per unit distance, and I(SOC) denotes the current supplied to the battery 70. For a person skilled in the art, the units of torque and power can be converted freely. In the specification of the present disclosure, the unit of torque and the unit of power may be mixed and used.

The driving mode of the vehicle may be determined as follow.

Figure 7:
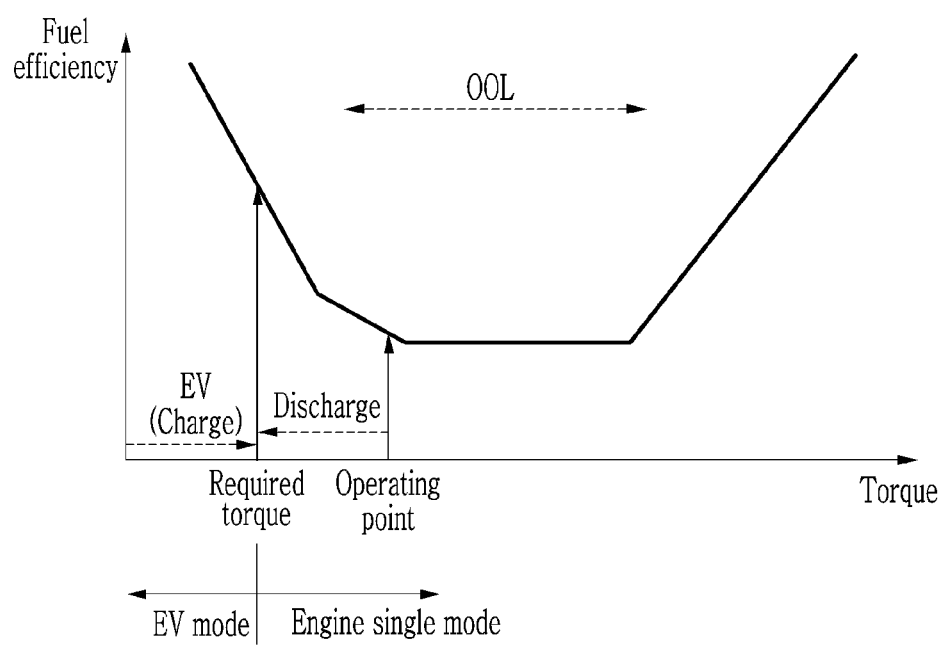
FIG. 7 to FIG. 11 are drawings for explaining a method of determining a driving mode of a vehicle according to an exemplary embodiment of the present disclosure.

Referring to FIG. 7, when the required torque of the driver is less than a first predetermined value and the driving mode of the battery to follow the optimal SOC is the discharging mode, the driving mode of the vehicle may be determined as the EV mode. And when the required torque of the driver is less than the first predetermined value and the driving mode of the battery is the charging mode, the driving mode of the vehicle may be determined as the engine single mode. Herein, the first predetermined value may be a value in which the required torque of the driver is smaller than an optimal operating line (OOL) or an optimal operating region (OOR) of the engine 10.

When the vehicle travels in the EV mode in a state where the driving mode of the battery is the discharging mode, as the required torque of the driver is output from the drive motor and the power charged in the battery is discharged, the optimal SOC is followed. At this time, the required torque of the driver output from the drive motor may be the average discharging amount to follow the optimal SOC.

When the vehicle travels in the engine single mode, as the engine is operated in the optimal operating point and a charging torque corresponding to a difference between the engine torque and the required torque at the optimal operating point is charged to the battery, the optimal SOC is followed. At this time, the charging torque may be the average discharging amount to follow the optimal SOC.

Figure 8:
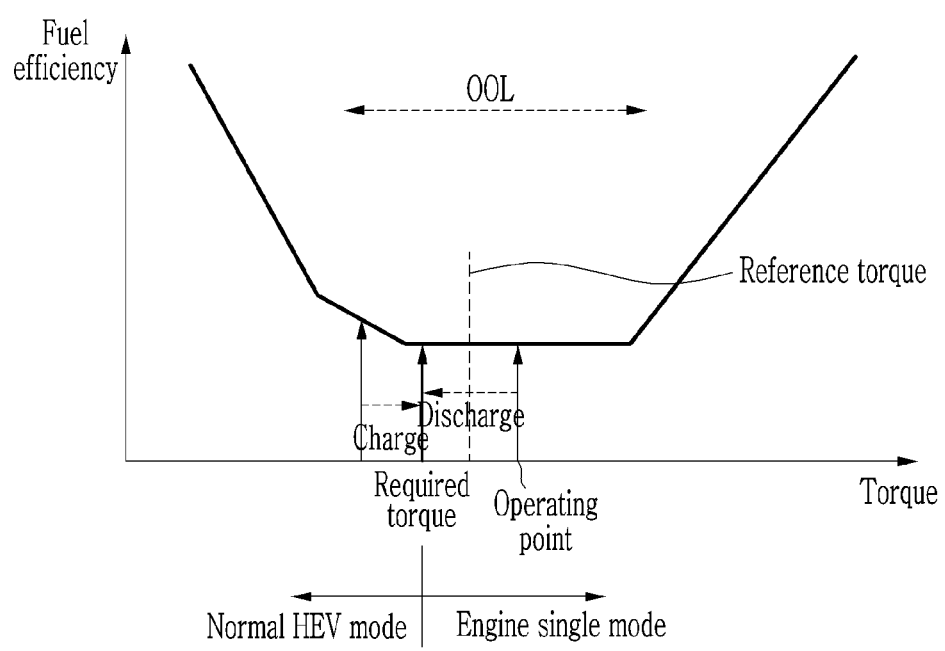

Referring to FIG. 8, when the required torque of the driver is less than a reference torque and the driving mode of the battery is the discharging mode in a state where the required torque of the driver is within an OOL (optimal operating line) or an OOR (optimal operating region), the driving mode of the vehicle may be determined as the normal HEV mode.

And when the required torque of the driver is greater than a reference torque and the driving mode of the battery is the charging mode in a state where the required torque of the driver is within an OOL (optimal operating line) or an OOR (optimal operating region), the driving mode of the vehicle may be determined as the engine single mode.

Here, the reference torque may be a torque for converting the driving mode of the vehicle from the engine single mode to the supercharged engine mode.

When the vehicle travels in the normal HEV mode in a state where the driving mode of the battery is the discharging mode, the engine is operated in the optimal operating point less than the required torque and the discharging torque of a difference between the engine torque at the optimal operating point and the required torque is output from the drive motor. That is, in the normal HEV mode, the engine torque is less than the required torque, and the optimal SOC is followed as the discharging torque between the engine torque and the required torque is assisted by the drive motor. At this time, the discharging torque may be the average discharging amount to follow the optimal SOC.

When the vehicle travels in the engine single mode in a state where the driving mode of the batter is the charging mode, the engine is operated in the optimal operating point greater than the required torque of the driver, and the optimal SOC is followed as the charging torque of a difference between the engine torque at the optimal operating point and the required torque is charged to the battery. At this time, the charging torque may be the average charging amount to follow the optimal SOC.

Figure 9:
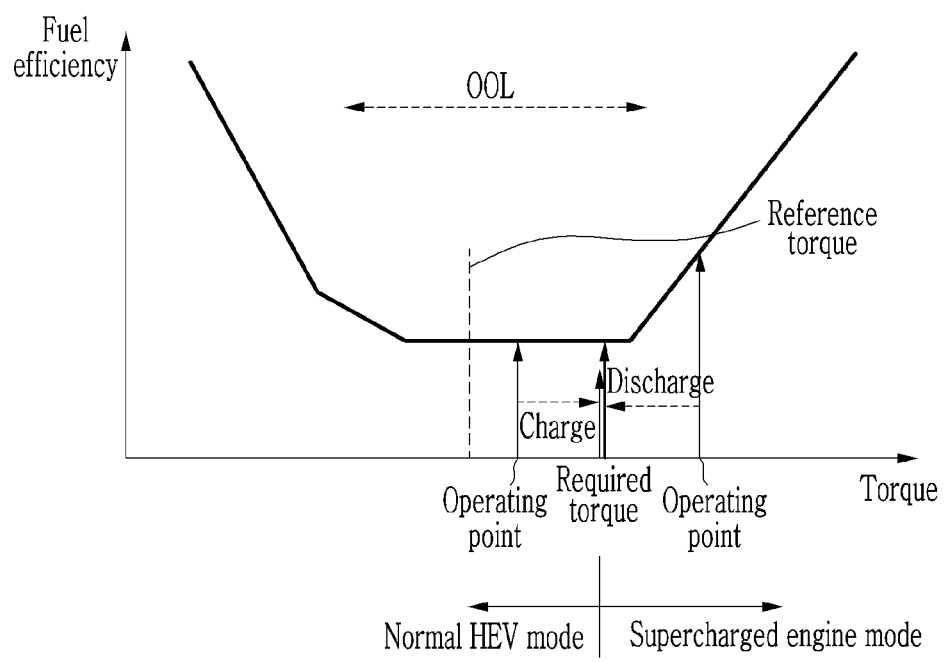

Referring to FIG. 9, when the required torque of the driver is less than the reference torque and the driving mode of the battery is the discharging mode in a state where the required torque of the driver is in the OOL or within the OOR, the driving mode of the vehicle may be determined as the normal HEV mode.

And when the required torque of the driver is greater than or equal to the reference torque and the driving mode of the battery is the charging mode in a state where the required torque of the driver is in the OOL or within the OOR, the driving mode of the vehicle may be determined as the supercharged engine mode.

When the vehicle travels in the normal HEV mode in a state where the driving mode of the battery is the discharging mode, the engine is operated at the optimal operating point less than the required torque, and the discharging torque of a difference between the engine torque at the optimal operating point and the required torque is output by the drive motor. That is, in the normal HEV mode, the engine torque is less than the required torque, and the optimal SOC followed as the discharging torque of a difference between the engine torque and the required torque is assisted by the drive motor. At this time, the discharging torque may be the average discharging amount to follow the optimal SOC.

And when the vehicle travels in the supercharged engine mode in a state where the driving mode of the battery is the charging mode, the engine is operated in the optimal operating point greater than the required torque of the driver by the electric supercharger, and the optimal SOC is followed as the charging torque of a difference between the engine torque at the optimal operating point and the required torque. At this time, the charging torque may be the average charging amount to follow the optimal SOC.

Here, in order to prevent the fuel efficiency of the engine from deteriorating, the operating point of the engine may be limited so as not to exceed the optimal operating point (or optimal operating region).

Figure 10:
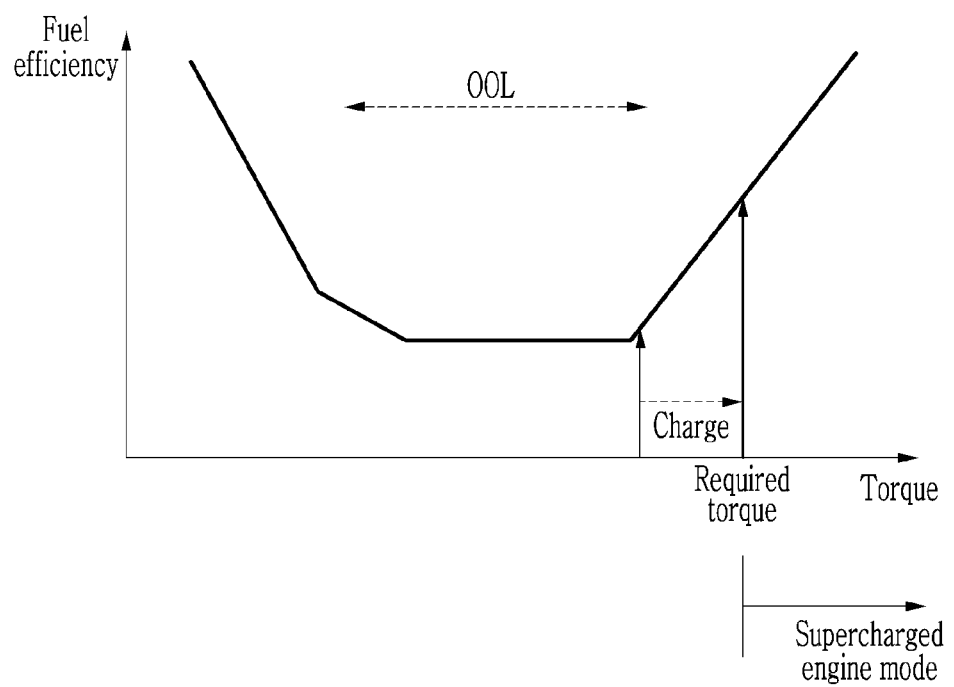
Figure 11:
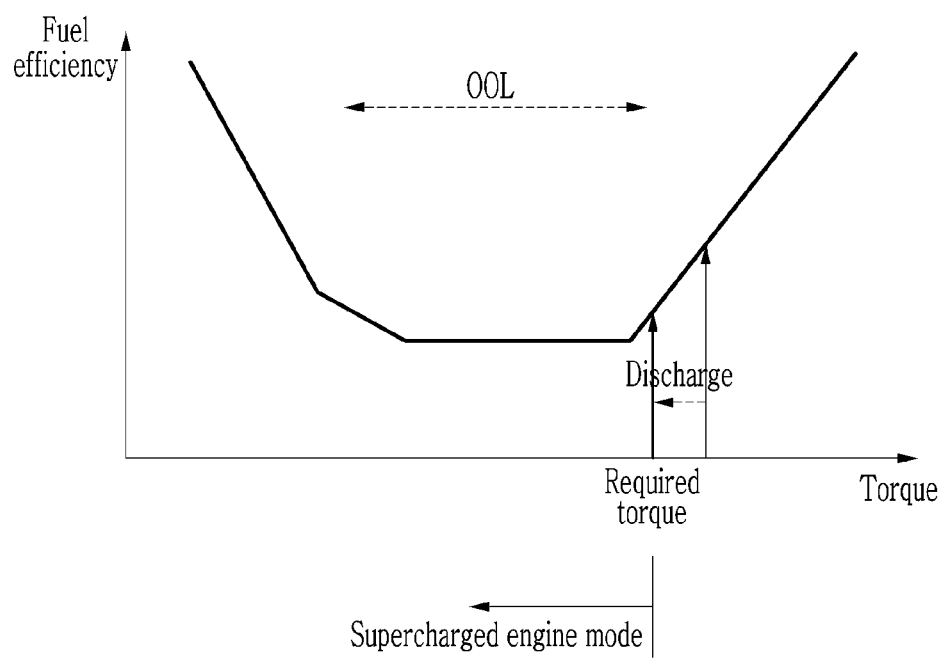

Referring to FIG. 10 and FIG. 11, when the required torque of the driver exceeds the OOL or OOR and the driving mode of the battery is the discharging mode, the driving mode of the vehicle may be determined as the supercharged HEV mode (refer to FIG. 10).

And when the required torque of the driver exceeds the OOL or OOR and the driving mode of the battery is the charging mode, the driving mode of the vehicle may be determined as the supercharged engine mode (see FIG. 11).

When the vehicle travels in the supercharged HEV mode in a state where the driving mode of the battery is the discharging mode, the electric supercharger is operated and the engine outputs a maximal torque in the OOL, and the optimal SOC is followed as the discharging torque of a difference between the engine torque and the required torque is assisted by the drive motor. In this case, the optimal SOC is followed as the battery is discharged by an operation of the drive motor and the electric supercharger. At this time, the discharging torque may be the average discharging amount to follow the optimal SOC.

And when the vehicle travels in the supercharged engine mode in a state where the driving mode of the battery is the charging mode, the engine outputs the engine torque greater than the required torque of the driver by the operation of the electric supercharger, and the optimal SOC is followed as the charging torque of a difference between the engine torque and the required torque is charged to the battery. At this time, the charging torque may be the average charging amount to follow the optimal SOC.

Meanwhile, if the driver's required torque changes instantaneously and a deviation between the optimal SOC and the current SOC (or measured SOC) occurs, the controller 90 adjusts the operating point of the engine to correct the deviation between the optimal SOC and the current SOC at step S50.

Figure 12:
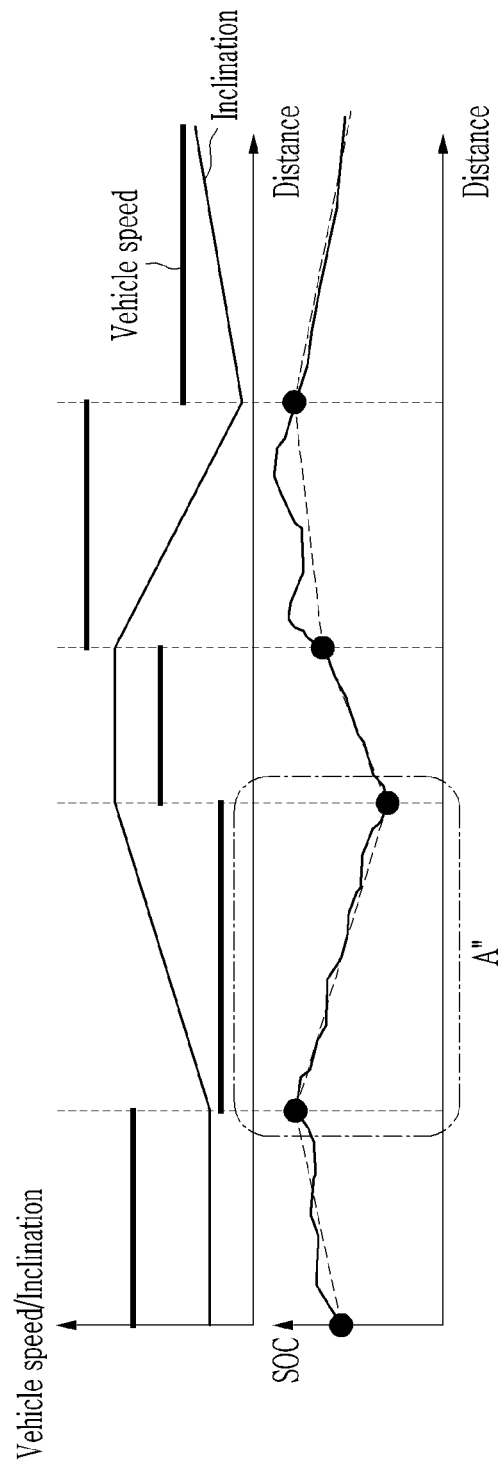
FIG. 12 and FIG. 13 are drawings for explaining a method of correcting an operating point according to an exemplary embodiment of the present disclosure.
Figure 13:
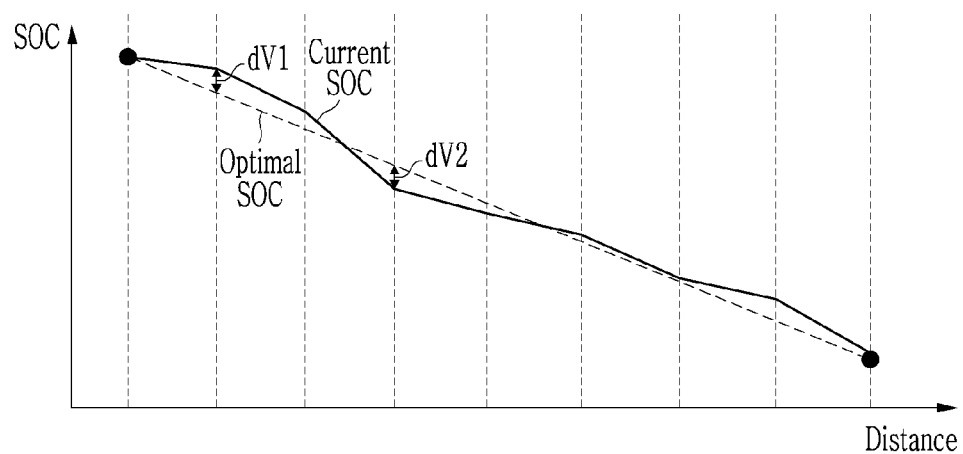

Referring to FIG. 12 and FIG. 13, when the required torque of the driver decreases momentarily and the discharging amount of the battery decreases (e.g., when the output torque of the drive motor decreases in HEV mode), the current SOC becomes smaller than the optimal SOC and the deviation dV1 between the current SOC and the optimal SOC may occur. In this case, in order to increase the discharging amount of the battery, the operating point of the engine may be adjusted in the direction of increasing the discharging torque, which is the difference between the required torque of the driver and the engine torque. Accordingly, the SOC of the battery 70 is decreased, and the current SOC follows the optimal SOC.

On the contrary, if the required torque of the driver increases instantaneously and the discharging amount of the battery increases (e.g., when the output torque of the drive motor increases in the HEV mode), the current SOC is greater than the optimal SOC, and deviation dV2 between the current SOC and the optimal SOC may occur. In this case, in order to decrease the discharging amount of the battery, the operating point of the engine may be adjusted in the direction of decreasing the discharging torque, which is the difference between the required torque of the driver and the engine torque. Accordingly, the SOC of the battery 70 is increased, and the current SOC follows the optimal SOC.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. An apparatus for controlling a vehicle, the apparatus comprising:
    an engine configured to combust fuel to generate power;
    a drive motor configured to assist the power of the engine and to selectively operate as a generator to generate electrical energy;
    a battery configured to supply electrical energy to the drive motor or to be charged by the electrical energy generated by the drive motor;
    an electric supercharger configured to be installed in an intake line in which an intake air supplied to a combustion chamber of the engine flows;
    a navigation device configure to calculate a driving path from a starting point to a destination point and driving information;
    a controller configure to calculate a driving load from the driving path and the driving information calculated by the navigation device, determine an optimal SOC (state of charge) for each section from the starting point to the destination point based on the driving load, determine a driving mode of the vehicle based on a required torque of a driver and a driving mode of the battery to follow the optimal SOC for each section, and adjust an operating point of the engine.

2. The apparatus of claim 1, wherein the driving mode of the vehicle includes:
    an EV (electric vehicle) mode in which the vehicle travels only with driving power of the drive motor;
    an engine single mode in which the vehicle travels with driving power of the engine without supplying supercharged air of the electric supercharger;
    a supercharged engine mode in which the vehicle travels with driving power of the engine by receiving the supercharged air from the electric supercharger;
    a normal hybrid electric vehicle (HEV) mode in which the vehicle travels with driving power of the drive motor and driving power of the engine without supplement of the supercharged air by the electric supercharger, and
    a supercharged HEV mode in which the vehicle travels with driving power of the drive motor and driving power of the engine with supplement of the supercharged air by the electric supercharger.

3. The apparatus of claim 2, wherein:
    when the required torque of the driver is less than a predetermined value which is less than an engine torque in an optimal operating line and the driving mode of the battery is a discharging mode, the controller determines the driving mode of the vehicle as the EV mode.

4. The apparatus of claim 2, wherein:
    when the required torque of the driver is less than a predetermined value which is less than an engine torque in an optimal operating line and the driving mode of the battery is a charging mode, the controller determines the driving mode of the vehicle as the engine single mode.

5. The apparatus of claim 2, wherein:
    when the required torque of the driver is less than a reference torque in an optimal operating line and the driving mode of the battery is a discharging mode, the controller determines the driving mode of the vehicle as the normal HEV mode.

6. The apparatus of claim 2, wherein:
    when the required torque of the driver is less than a reference torque in an optimal operating line and the driving mode of the battery is a charging mode, the controller determines the driving mode of the vehicle as the normal HEV mode.

7. The apparatus of claim 2, wherein:
    when the required torque of the driver is greater than a reference torque in an optimal operating line and the driving mode of the battery is a discharging mode, the controller determines the driving mode of the vehicle as the normal HEV mode.

8. The apparatus of claim 2, wherein:
    when the required torque of the driver is greater than a reference torque in an optimal operating line and the driving mode of the battery is a charging mode, the controller determines the driving mode of the vehicle as the supercharged engine mode.

9. The apparatus of claim 2, wherein:
    when required torque of the driver exceeds an optimal operating line and the driving mode of the battery is a discharging mode, the controller determines the driving mode of the vehicle as the supercharged HEV mode.

10. The apparatus of claim 2, wherein:
    when required torque of the driver exceeds an optimal operating line and the driving mode of the battery is a charging mode, the controller determines the driving mode of the vehicle as the supercharged engine mode.

11. A method of controlling a hybrid vehicle provided with an electric supercharger, the method comprising:
    calculating, by a navigation device, a driving path from a starting point to a destination point and driving information;
    calculating, by a controller, a driving load based on the driving path and the driving information;

calculating, by the controller, an optimal SOC (state of charge) of a battery for each section based on the driving load;

determining, by the controller, a driving mode of the vehicle based on a required torque of a driver and a driving mode of the battery to follow the optimal SOC for each section; and adjusting, by the controller, an operating point of an engine.

12. The method of claim 11, wherein the driving mode of the vehicle includes:

an EV (electric vehicle) mode in which the vehicle travels only with driving power of a drive motor;

an engine single mode in which the vehicle travels with driving power of the engine without supplying supercharged air of the electric supercharger;

a supercharged engine mode in which the vehicle travels with driving power of the engine by receiving the supercharged air from the electric supercharger;

a normal hybrid electric vehicle (HEV) mode in which the vehicle travels with driving power of the drive motor and driving power of the engine without supplement of the supercharged air by the electric supercharger, and a supercharged HEV mode in which the vehicle travels with driving power of the drive motor and driving power of the engine with supplement of the supercharged air by the electric supercharger.

13. The method of claim 12, wherein:

when the required torque of the driver is less than a predetermined value which is less than an engine torque in an optimal operating line and the driving mode of the battery is a discharging mode, the driving mode of the vehicle is determined as the EV mode.

14. The method of claim 12, wherein:

when the required torque of the driver is less than a predetermined value which is less than an engine torque in an optimal operating line and the driving mode of the battery is a charging mode, the driving mode of the vehicle is determined as the engine single mode.

15. The method of claim 12, wherein:

when the required torque of the driver is less than a reference torque in an optimal operating line and the driving mode of the battery is a discharging mode, the driving mode of the vehicle is determined as the normal HEV mode.

16. The method of claim 12, wherein:

when the required torque of the driver is less than a reference torque in an optimal operating line and the driving mode of the battery is a charging mode, the driving mode of the vehicle is determined as the normal HEV mode.

17. The method of claim 12, wherein:

when the required torque of the driver is greater than a reference torque in an optimal operating line and the driving mode of the battery is a discharging mode, the driving mode of the vehicle is determined as the normal HEV mode.

18. The method of claim 12, wherein:

when the required torque of the driver is greater than a reference torque in an optimal operating line and the driving mode of the battery is a charging mode, the driving mode of the vehicle is determined as the supercharged engine mode.

19. The method of claim 12, wherein:

when required torque of the driver exceeds an optimal operating line and the driving mode of the battery is a discharging mode, the driving mode of the vehicle is determined as the supercharged HEV mode.

20. The method of claim 12, wherein:

when required torque of the driver exceeds an optimal operating line and the driving mode of the battery is a charging mode, the driving mode of the vehicle is determined as the supercharged engine mode.

* * * * *